United States Patent [19]

Finnocchiaro

[11] Patent Number: 5,679,396
[45] Date of Patent: *Oct. 21, 1997

[54] NON-FAT, REDUCED FAT AND LOW FAT CHEESES AND METHOD OF MAKING

[75] Inventor: Eugene T. Finnocchiaro, Milton, Mass.

[73] Assignee: Opta Food Ingredients, Inc., Bedford, Mass.

[*] Notice: The portion of the term of this patent subsequent to Dec. 17, 2013, has been disclaimed.

[21] Appl. No.: 473,715

[22] Filed: Jun. 7, 1995

Related U.S. Application Data

[63] Continuation-in-part of Ser. No. 324,513, Oct. 14, 1994, abandoned, which is a continuation-in-part of Ser. No. 138,541, Oct. 15, 1993, Pat. No. 5,470,391, which is a continuation-in-part of Ser. No. 900,899, Jun. 18, 1992, abandoned.

[51] Int. Cl.[6] .................................................. A23C 19/00
[52] U.S. Cl. ........................ 426/582; 426/580; 426/658; 426/661; 127/38
[58] Field of Search ........................... 426/582, 658, 426/661, 34, 36, 580; 127/38

[56] References Cited

U.S. PATENT DOCUMENTS

| | | | |
|---|---|---|---|
| 3,086,890 | 4/1963 | Sarko et al. | 127/69 |
| 3,238,064 | 3/1966 | Macarus et al. | 127/69 |
| 3,515,591 | 6/1970 | Feldman et al. | |
| 3,650,770 | 3/1972 | Marcotta et al. | 99/139 |
| 3,666,557 | 5/1972 | Jensen et al. | 127/32 |
| 3,836,677 | 9/1974 | Freck et al. | 426/103 |
| 3,962,465 | 6/1976 | Richter et al. | 426/48 |
| 3,986,890 | 10/1976 | Richter et al. | 127/38 |
| 4,252,900 | 2/1981 | Muller et al. | 435/161 |
| 4,280,851 | 7/1981 | Pitchon et al. | 127/33 |
| 4,427,709 | 1/1984 | Guhl et al. | 426/578 |
| 4,452,978 | 6/1984 | Eastman | 536/111 |
| 4,499,116 | 2/1985 | Zwiercan et al. | 426/582 |
| 4,510,166 | 4/1985 | Lenchin et al. | 426/565 |
| 4,568,555 | 2/1986 | Spanier | 426/582 |
| 4,594,255 | 6/1986 | Wilson et al. | 426/578 |
| 4,608,265 | 8/1986 | Zwiercan et al. | 426/582 |
| 4,623,549 | 11/1986 | Katt et al. | 426/548 |
| 4,695,475 | 9/1987 | Zwiercan et al. | 426/582 |
| 4,917,915 | 4/1990 | Cain et al. | 426/573 |
| 4,937,091 | 6/1990 | Zallie et al. | 426/582 |
| 4,956,193 | 9/1990 | Cain et al. | 426/573 |
| 4,971,723 | 11/1990 | Chiu | 252/315.3 |
| 4,992,539 | 2/1991 | Portnoy et al. | 536/120 |
| 5,051,271 | 9/1991 | Iyengar et al. | 426/658 |
| 5,108,773 | 4/1992 | Smith et al. | 426/582 |
| 5,131,953 | 7/1992 | Kasica et al. | 127/65 |
| 5,180,604 | 1/1993 | Crane et al. | 426/582 |
| 5,208,061 | 5/1993 | de Coninck et al. | 426/573 |
| 5,215,778 | 6/1993 | Davison et al. | 426/582 |
| 5,250,316 | 10/1993 | Harris | 426/573 |
| 5,275,837 | 1/1994 | Eastman | 426/661 |
| 5,281,432 | 1/1994 | Zallie et al. | 426/549 |
| 5,286,510 | 2/1994 | Bauer et al. | 426/573 |
| 5,320,860 | 6/1994 | Duval et al. | 426/582 |
| 5,324,532 | 6/1994 | Stute et al. | 426/578 |
| 5,338,560 | 8/1994 | Wesdorp et al. | 426/573 |
| 5,372,835 | 12/1994 | Little et al. | 426/573 |
| 5,374,442 | 12/1994 | Harris et al. | 426/573 |
| 5,387,426 | 2/1995 | Harris et al. | 426/573 |
| 5,395,630 | 3/1995 | Gamay | 426/39 |
| 5,395,640 | 3/1995 | Harris et al. | 426/573 |
| 5,484,618 | 1/1996 | Barz et al. | 426/304 |
| 5,584,937 | 12/1996 | Finocchiaro | 127/38 |

FOREIGN PATENT DOCUMENTS

| | | |
|---|---|---|
| 2047266 | 11/1992 | Canada. |
| 0120498A3 | 10/1984 | European Pat. Off. |
| 0298561A2 | 1/1989 | European Pat. Off. |
| 298561 A2 | 1/1989 | European Pat. Off. |
| 0366898A1 | 5/1990 | European Pat. Off. |
| 0372184A1 | 6/1990 | European Pat. Off. |
| 0441494A1 | 8/1991 | European Pat. Off. |
| 0443844A1 | 8/1991 | European Pat. Off. |
| 0480433A2 | 4/1992 | European Pat. Off. |
| 0495407A1 | 7/1992 | European Pat. Off. |
| 512249 A1 | 11/1992 | European Pat. Off. |
| 516107 A1 | 12/1992 | European Pat. Off. |
| 519104 A1 | 12/1992 | European Pat. Off. |
| 0529892A1 | 3/1993 | European Pat. Off. |
| 0554818A2 | 8/1993 | European Pat. Off. |
| 558832 A2 | 9/1993 | European Pat. Off. |
| 0590203A1 | 4/1994 | European Pat. Off. |
| 590203 A1 | 4/1994 | European Pat. Off. |
| 648425 A2 | 4/1995 | European Pat. Off. |
| 1562275 | 3/1980 | United Kingdom. |
| 89/12403 | 12/1989 | WIPO. |
| 91/02463 | 3/1991 | WIPO. |
| 92/02147 | 2/1992 | WIPO. |
| 93/03629 | 3/1993 | WIPO. |
| 93/03630 | 3/1993 | WIPO. |
| 93/25084 | 12/1993 | WIPO. |
| 94/05163 | 3/1994 | WIPO. |
| 94/09645 | 5/1994 | WIPO. |
| 95/14389 | 6/1995 | WIPO. |
| 95/21534 | 8/1995 | WIPO ................ A23C 19/00 |

OTHER PUBLICATIONS

Prosser, S. L., "Composition and Method of Preparing Reduced Fat Spreads," United States Statutory Invention Registration No. H1394, Published 03 Jan. 1995.

*Primary Examiner*—Leslie Wong
*Attorney, Agent, or Firm*—Hamilton,Brook,Smith & Reynolds, P.C.

[57] ABSTRACT

Fat free, reduced fat and low fat cheeses, including natural cheese and processed cheese, and method for making the cheeses are described. The natural cheeses and processed cheeses contain a pregelatinized, high amylose starch based texturizing agent that can partially or totally replace fat and/or fillers which are traditionally incorporated into cheese formulations. The natural cheeses and processed cheeses have the textural and organoleptic mouthfeel properties of full fat, conventional natural cheeses and processed cheeses.

36 Claims, No Drawings

NON-FAT, REDUCED FAT AND LOW FAT CHEESES AND METHOD OF MAKING

RELATED APPLICATIONS

This is a continuation-in-part of U.S. patent application Ser. No. 08/324,513, filed Oct. 14, 1994, now abandoned, which is a continuation-in-part of U.S. patent application Ser. No. 08/138,541, filed Oct. 15, 1993, now U.S. Pat. No. 5,470,391, which is a continuation-in-part of U.S. patent application Ser. No. 07/900,899, filed Jun. 18, 1992, now abandoned. The entire teachings of each application are incorporated herein by reference.

BACKGROUND OF THE INVENTION

Natural cheese is generally prepared by the following steps: setting the milk, typically by treating with proteolytic enzymes and acidifying directly with acidulants or with lactic acid cultures, cutting or breaking the curd, cooking the curds, draining or dipping the whey, knitting and transforming the curds, salting the curds, and pressing. The substantial milk fat content of natural cheese not only contributes to the overall cheese yields but also provides a soft body and texture with desirable melt characteristics. Elimination or substantial reduction of the fat content of natural cheese results in a more expensive cheese product with a relatively high percentage of protein. Without the disruptive effect of the fat globules, the cheese also tends to be tough and rubbery in texture with poor melt characteristics.

Processed cheese is conventionally prepared by blending milkfat-containing cheeses and other dairy products such as whey solids and other milk protein isolates with emulsifying salts, such as disodium phosphate and sodium citrate, at elevated temperatures to produce a homogeneous, pumpable, fluid cheese material which maybe formed into sheets, slices or other forms, and packaged for consumer use. The substantial milkfat content of processed cheeses not only provides a soft body and texture as well as desirable melt characteristics, but also facilitates the processing of the natural cheese components at elevated temperatures in the manufacturing process. Elimination or even substantial reduction of the fat content of processed cheese may have a detrimental effect on the body, texture and melt characteristics of the resulting product as well as the processing of the cheese melt.

The consumer's demand for low-fat foods that retain the quality of the corresponding full-fat formulation has led to the development of a large number of potential texturizing agents and fat replacers based on proteins, polyesters, and a variety of other approaches. Several examples of fat replacers derived from starch include: a partially debranched starch used for providing fat-like texture, forming opaque clouds and producing thermoreversible gels (EP Application 0 372 184 A1 and U.S. Pat. No. 4,971,723 issued to Chiu); cold-water soluble and pregelatinized converted starches (by acid, enzyme or oxidation treatment) for use as fat or oil replacement in ice cream and mayonnaise (U.S. Pat. No. 4,510,166 issued to Lenchin et al.); enzyme-hydrolyzed thermoreversible starch gels as fat substitutes in mayonnaise, cream cheese, whipped cream and meat applications (U.S. Pat. Nos. 3,962,465 and 3,986,890 issued to Richter et al.); aqueous dispersion of granular starch hydrolysate (EP Application 0 443 844 A1 issued to Chiu et al.); macrocolloid carbohydrate particles for use in ice cream, yogurt, salad dressings, mayonnaise, coffee whitener and sour cream (PCT Application WO 89/12403 to Singer et al.); two-phase protein and carbohydrate fat substitute for use in salad dressings and cookie fillings (EP Application 0 441 494 A1 to Reimer); fat substitute comprising hydrated alginate and a complex carbohydrate (PCT Application WO 92/02147 to Shemer and Shemer); and insoluble modified starch used as a bulking agent, filler or texturizing agent in low-fat formulations (U.S. Pat. 5,051,271 issued to Iyengar et al.).

A number of methods have been developed to modify starches for use in food formulations and include: subjecting defatted amylose-containing starch to high temperature and shear to disrupt the starch granules thereby producing a gel (U.S. Pat. No. 3,666,557 issued to Jensen and Long); cooking high amylose starch at 140°–170° C. to produce a solubilized cold water dispersible starch (U.S. Pat. No. 3,515,591 issued to Feldman et al.); cooking high amylose starch under shear at a temperature higher than the gelatinization temperature to produce a yellow gel (U.S. Pat. No. 3,836,677 issued to Freck et al.); and subjecting high amylose starches to a jet cooking/spray drying process to produce a pregelatinized starch (E.P. Application 0 366 898 A1 and U.S. Pat. No. 5,131,953 issued to Kasica and Eden).

Reduced fat processed cheese and cream cheese products have been previously described. See U.S. Pat. No. 5,215,778 issued to Davidson et al. which describes a substantially fat free processed cheese containing microreticulated microcrystalline cellulose that enhances the textural and mouthfeel characteristics; U.S. Pat. Nos. 5,171,603 and 5,098,728 issued to Singer et al. which disclose the use of non-aggregated particles of denatured protein to make reduced fat processed cheese.

It is desirable to produce non-fat, reduced fat and low fat natural cheeses and processed cheeses which have the texture and mouthfeel characteristics of conventional, full fat natural cheeses and processed cheeses, as well as desirable stability and functional characteristics.

SUMMARY OF THE INVENTION

This invention relates to fat free, reduced fat and low fat cheeses, including natural cheese and processed cheese, that have the taste, mouthfeel, textural properties and curd yield of a full fat natural or processed cheese, and to methods for making the cheeses. The natural cheeses and processed cheeses comprise a starch based texturizing agent that is derived from pregelatinized, high amylose starch which has a dextrose equivalent (DE) value for the starch component of less than about 5, with less than about 1.5 being preferred. A preferred starch based texturizing agent is one which is derived from high amylose starch that has been pregelatinized and spray dried into a powder which is retrograded and crystalline; partially retrograded and crystalline; or nonretrograded and noncrystalline.

The starch based texturizing agent is incorporated into traditional cheese formulations to yield a natural cheese or processed cheese that has the sensory and visual attributes, including the melt down properties, of equivalent full fat formulations. The starch based texturizing agent can be effectively used to replace fat-containing ingredients, as well as fillers which are traditionally incorporated into cheese formulations, such as microcrystalline cellulose (MCC), non-fat dry milk (NFDM), skim cheese, sweet whey and other milk protein isolates.

The texturizing agent is easily incorporated into milk, thereby allowing the use of traditional cheese-making techniques to yield a natural cheese that has the sensory and visual attributes, including the melt down properties, of equivalent full fat products. The texturizing agent partitions into the curd, most likely disrupting the casein microstructure, and unexpectedly enhances the texture and moisture retention of the natural cheese. The retention of moisture in the cheese curd is a key requirement in offsetting the cost and textural problems associated with higher non-fat solids in low and reduced fat natural cheeses.

The addition of the texturizing agent as a fat and/or filler replacer does not compromise the flavor, color or melt down properties of the resultant natural cheeses or processed cheeses. The natural cheeses and processed cheeses prepared according to this invention have desirable finished moistures and/or curd yield, with textures equivalent to their full fat counterparts. The finished moistures enable the natural cheese or processed cheese to be shredded or sliced. The natural cheese or processed cheese has good melt down properties that are well suited for cooking and food preparation in which melted cheese is employed. The processed cheese further has the ability to heat up and cool down quickly, which may increase the rate at which non-fat and low fat processed cheeses can be manufactured. The reduction and potential elimination of some traditional ingredients may provide an overall savings in manufacturing cost.

DETAILED DESCRIPTION OF THE INVENTION

This invention relates to fat free, reduced fat and low fat cheeses, including natural cheeses and processed cheeses, that have textural and organoleptic mouthfeel properties of a full fat, conventional natural cheese or processed cheese, and to methods for making the cheeses. The natural cheese or processed cheese comprises traditional cheese ingredients and a starch based texturizing agent that is derived from pregelatinized, high amylose starch which has a DE value of less than about 5, with less than 1.5 being preferred. Traditional ingredients comprise non-fat and/or fat containing dairy ingredient(s), optional emulsifying salt(s) and adjunct ingredients, such as hydrocolloids, gums and carbohydrate products, and one or more flavoring agents. The non-fat, reduced fat and low fat natural and processed cheeses have the sensory and visual attributes, as well as the melt down properties, of equivalent full fat products. The reduction in fat translates into reduction in overall calories of the finished cheese.

The terms "cheese" or "cheeses" shall include both natural and processed cheeses, and shall include any form of natural and processed cheeses, including but not limited to slices, blocks, grated cheese and cheese spreads.

The present invention can be used to prepare any type of reduced fat or non-fat natural cheese, including but not limited to blue cheese, cheddar cheese, camembert cheese, colby cheese, gouda cheese, jack cheese, mozzarella cheese, muenster cheese, parmesan cheese, cottage cheese, ricotta cheese and romano cheese. The term "natural cheese" shall include these cheeses, as well as other cheeses made by concentrating the insoluble components of milk and transforming or curing these components.

The term "processed cheese" shall embrace processed cheese food, processed cheese spreads and imitation cheese, all of which can optionally be pasteurized.

A processed cheese can be made from a reduced fat or non-fat natural cheese of this invention. The reduced fat/non-fat processed cheese can be made by mechanically reducing the reduced fat or non-fat natural cheese to a uniform mixture of fine particle size, and then dry blending a mixture of the appropriate functional processed cheese ingredients, such as emulsifying agents, preservatives, gelling agents, proteins, sweeteners and acidifying agents.

The terms "non-fat" and "fat free" are intended to mean herein a natural cheese or processed cheese that contains less than 0.5 gram total fat per 30 gram serving. The term "reduced fat" is intended to mean herein a natural cheese or processed cheese having greater then or equal to a 25% reduction in fat compared to the full fat equivalent. The term "low fat" is intended to mean a natural cheese or processed cheese that contains 3 grams total fat per 50 gram serving. These levels of fat are consistent with the definitions of "fat free", "reduced fat" and "low fat" as set forth by the Nutrition Labeling and Education Act (NLEA), Federal Register, Jan. 6, 1993.

For purposes of the present invention, the term "starch based texturizing agent" will be used to describe products derived from pregelatinized, high amylose (greater than about 30% by weight amylose as determined by iodine binding) starch which has been processed under specific conditions of temperature, pressure and shear, and has a dextrose equivalent (DE) value for the starch component itself of less than about 5, with about 1.5 being preferred, as determined by the Luff-Schoorl method, Procedure D52, Corn Industry's Research Foundation, 6th Edition. Methods for making the texturizing agents are described in detail in U.S. Pat. No. 5,470,391, published PCT Application No. WO 95/10196, and U.S. Pat. No. 5,584,937. The teachings of these documents are incorporated herein by reference in their entirety. According to these methods, excipients can be incorporated into the final texturizing agent. When an excipient is incorporated into the starch based texturizing agent, the DE value will vary depending upon the amount and type of excipient that is used. Incorporation of about 25% by weight maltodextrin as excipient results in a product with good properties for this application. Examples of commercially available maltodextrins include M040 (DE value of 4–8) and M100 (DE of 10), both of which are produced by Grain Processing Corporation.

According to this invention, in natural cheese making the starch based texturizing agent is dispersed into milk having a butter fat content of from about 0.05% to about 1.5%. The exact butter fat content will be dictated by the amount of fat desired in the final product. The amount of texturizing agent used will depend upon the desired end product. Preferably the texturizing agent will be added in amount of from about 0.1% to about 1.0% by weight, with from about 0.2% to about 0.4% by weight being preferred. The starch based texturizing agent can be used in conjunction with other adjunct ingredients such as hydrocolloids, gums and carbohydrate products (e.g., carrageenan, microcrystalline cellulose, carboxymethyl cellulose, alginate, guar gum and modified starch).

The milk dispersion is heated to a temperature of 61° F. to 200° F. (72.2° C. to 93° C.) to pasteurize the milk. Heating time will depend on the temperature selected and is not critical, provided sufficient time is allowed to complete the pasteurization.

Following pasteurization, calcium chloride (preferably about 0.02% by weight based on weight of liquid milk) is optionally added. The addition of calcium chloride is not essential but can be desirable since it provides additional calcium and also assists in the interaction between the gelling polysaccharides, such as carrageenan, and the milk proteins, thereby providing a more desirable curd structure.

A cheese culture or a mixture of cheese cultures is then added with stirring to the milk. The choice of the cheese culture is determined by the type of end product cheese that is desired. For example, for the production of Mozzarella cheese the culture *Streptococcus thermophilus* and *Lactobacillus bulgaricus* can be used. Cultures employed for reduced fat natural cheeses include but are not limited to *Streptococcus lactis, Streptococcus cremoris, Streptococcus thermophilus, Lactobacillus helveticus, Lactobacillus bulgaricus* and *Lactobacillus casei*. Pure strains of these cultures can be obtained commercially. The milk dispersion containing the culture or cultures is incubated as needed to achieve the propagation of the cultures in the milk dispersion. The incubation time and temperature will depend on the culture. Generally, a temperature of from about 80° F to about 100° F. (26.7° C. to 37.8° C.) for 30 to 60 minutes is desirable, provided the temperature chosen does not inactivate or interfere With the propagation of the bacteria. The cheese cultures typically cause a slight decrease in the pH of the milk.

Pure liquid rennet is then added with stirring to the cultured milk product. After addition of the rennet or other clotting enzymes, the milk dispersion is allowed to stand quiescently until coagulation occurs, usually from about 30 to about 45 minutes. During the curd clotting, the texturizing agent is entrapped uniformly within the curd structure.

The coagulum is then processed to obtain the reduced fat natural cheese using techniques known to those skilled in the art of cheese making (see Kosikowski, "Cheese and Fermented Milk Foods", 2nd edition, (F. V. Kosikowski and Associates, Brooktondale, N.Y., 1982). The following standard steps in the processing of the coagulum are:

1. The coagulum (curd) is cut into at least ¼inch cubes and allowed to heal for 15 to 30 minutes.
2. The cubed curd is cooked by raising the temperature to 100° F. (37.8° C.) over a 30 minute period with gentle agitation and then held at 100° F. (37.8° C.) format least 30 minutes.
3. The curd is allowed to re-knit and the whey drained.
4. The curd is washed.
5. The curd is matted and cut into slabs.
6. The curd is milled with salt.
7. The milled natural cheese is hooped and pressed for about 16 hours.

Dairy flavors can be added initially to the liquid milk before or after pasteurization but before processing of the curd. The addition of such flavors at an early stage of the cheese manufacturing enhances flavor in the end product. Natural cheeses produced by this method have a non-fat or reduced fat content and have the textural and organoleptic mouthfeel properties of their full fat natural cheese counterparts.

According to this invention, no special processing modifications are required to produce non-fat, reduced fat or low fat processed cheeses. The starch based texturizing agent is blended into traditional cheese ingredients (e.g., non-fat, reduced fat and low fat dairy ingredients, optional emulsifiers, and flavoring agents) to produce a processed cheese. However, it is desirable to completely hydrate the texturizing agent in order to uniformly distribute the texturizing agent in the cheese ingredients. The texturizing agent can be mixed into the liquid ingredients under high shear to form a slurry or paste. Alternatively, the powdered texturizing agent can be blended with the dry cheese ingredients and then mixed with the remaining ingredients using a direct steam injection auger mixer/cooker commonly used in the processed cheese industry. The resultant cheese melt can be packaged in accordance with conventional packaging procedures into blocks, slices, spreads or cold packs, or it can be shredded. See *Cheese and Fermented Milk Foods* by F.V. Kosikowski, pp 382–406, the entire teachings or which are incorporated herein by reference.

The amount of texturizing agent used will depend upon the desired end product. Preferably the texturizing agent can be added in amounts of from about 1.0% to about by weight, with from about 1.5% to about 2.5% by weight being preferred.

The starch based texturizing agent can effectively replace fat containing ingredients as well as partially or totally replace fillers which are traditionally incorporated into cheese formulations. The texturizing agent can be used in place of or in combination with skim milk cheese, dry cottage cheese, whey, whey protein concentrate, skim milk, non-fat dry milk, microcrystalline cellulose, carrageenan, carboxymethyl cellulose, hydrolyzed oat and corn flours, xanthan gum, guar gum, casein, maltodextrin, cellulose and milk proteins.

A fat free processed cheese will comprise the starch based texturizing agent, non-fat dairy ingredient(s), optional emulsifying salt and one or more flavoring agents. Non-fat dairy ingredient(s) include, but are not limited to, skim milk cheese, non-fat dry milk, skim milk, skim butter milk and milk protein isolates (e.g., caseinates, whey protein isolates and/or concentrates). Low fat dairy ingredient(s) or fat containing dairy ingredient(s) can be incorporated into the formulation, such as whole milk, whole milk cheese, reduced fat milk and non-fat milk cheese.

Suitable flavoring agents such as buttermilk solids, natural and artificial butter and dairy flavor components, enzyme modified cheese, and mixtures thereof, may be incorporated into the cheese formulations of this invention. Flavoring ingredients containing fats should not be used in amounts which would increase the total fat content of the finished non-fat product above the desired levels of 1.6%. Fruits, vegetables, meats and spices, such as pimento, peppers, fat free natural or analog bacon bits and the like, may also be provided as adjunct components in a matrix of the processed cheese. The amount of these components will depend upon the desired end product.

The processed cheese can also be made from a reduced fat or non-fat natural cheese of this invention. The reduced fat or non-fat natural cheese can be mechanically reduced to a uniform mixture of fine particle size and blended with the appropriate functional processed cheese ingredients, such as emulsifying agents, preservatives, gelling agents, proteins, sweeteners and acidifying agents, to produce a reduced fat or non-fat processed cheese.

Non-fat, reduced fat and low fat processed cheese containing the starch based texturizing agent can be made without the need for any emulsifying salts. However, conventional emulsifying salts utilized in fat-containing processed cheese can be optionally used in the formulations of this invention. One or more emulsifying salts can be used and include monosodium phosphate, disodium phosphate, dipotassium phosphate, trisodium phosphate, sodium metaphosphate (sodium hexametaphosphate), sodium acid pyrophosphate, tetrasodium pyrophosphate, sodium aluminum phosphate, sodium citrate, potassium citrate, calcium citrate, sodium tartrate and sodium potassium tartrate. Preferred examples of suitable emulsifying salts include disodium phosphate in an amount of from about 0.5 to about 2.5 percent by weight; sodium citrate in an amount of from about 0.25 to about 1.5 weight percent; trisodium phosphate in an amount of from about 0.5 to about 2.0 weight percent.

It is not critical to monitor the pH during the manufacture of the cheese. However, an acceptable finished cheese will have a pH in the range of from about 5.1 to about 5.9.

Natural cheeses and processed cheeses produced according to this invention have good finished moistures but yield firm, cohesive cheese blocks. These finished moistures enable the cheese to be shredded or sliced. Retention of water in the final natural cheese or processed cheese further results in an overall increased weight of the product. Due to increased water content, compared to a similar product that does not contain the texturizing agent, the natural cheese or processed cheese has a better body. The natural cheese or processed cheese also has good melt down properties that are well suited for cooking and food preparation in which melted cheese is employed. The processed cheese further has the ability to heat up and cool down quickly, which may increase the rate at which non-fat, reduced fat and low fat processed cheeses can be manufactured. The reduction and potential elimination of some traditional ingredients and increased product weight may provide an overall savings in manufacturing cost.

The invention is further illustrated by the following examples which are not to be construed as limiting in any way. All percentages used herein are by weight based on the final weight of the product.

EXAMPLES

Natural Cheese Formulations

Ingredients

Maltodextrin M100 (DE=10) manufactured by Grain Processing Corporation.

Pregelatinized, high amylose starch based texturizing agent (OPTAGRADE®) manufactured by Opta Food Ingredients, Inc., prepared by spray drying hot pregelatinized, high amylose starch and 25% maltodextrin (M040 from Grain Processing Corporation).

Pasteurized skim milk (retail grade)

Distilled vinegar (50 grain, retail grade)

Chymogen Enzyme (single strength liquid, Chris Hansen, Milwaukee, Wis.)

Direct Cheddar Mesophilic Homofermentative Culture (DVS 970 pellets: STC4 and LHBO1, Chris Hansen, Milwaukee, Wis.)

Direct Mozzarella Mesophilic Homofermentative Culture (DVS pellets STC4 and LHBO1, Chris Hansen, Milwaukee, Wis.)

Annatto Color (Marshall Products, Madison, Wis.)

Example 1
Non-fat Ricotta Cheese

| Ingredients | Weight/Weight Percentage |
|---|---|
| Skim milk | 99.70 |
| Texturizing Agent | 0.30 |
| Distilled vinegar | (to pH 5.7) |
| | 100.00 |

Process

1. Milk was heated to 200° F. (93° C.) and placed in preheated glass jar of a standard kitchen blender. Texturizing agent was added while mixing on medium speed. Once the powdered texturizing agent was dispersed, the mixture was mixed on high speed for five minutes.

2. The texturizing agent/milk mixture was cooled to 40° F. (4.4° C.).

3. The acid was slowly added while mixing with an overhead stirrer. The contents were transferred to a hot-water bath and heated to 190° F. (87.7° C.) with occasional gentle stirring. Once at the target temperature, the gel was allowed to set for 30 minutes without agitation.

4. The resultant curd was filtered through 4 layers of cheese cloth and chilled in refrigeration for at least 4 hours. The resultant curd was rinsed in 40° F. (4.4° C.) water to remove excess acetic acids.

The non-fat ricotta cheese containing the texturizing agent represented a significant improvement in quality and cheese yield compared to the skim ricotta prepared without the texturizing agent. The presence of the texturizing agent resulted in a smoother and creamier texture versus the dry and crumbly texture without the texturizing agent. Table 1 gives the cheese yield and sensory data.

TABLE 1

| Product | Cheese Yield (%) | Total Solids (%) | Texture |
|---|---|---|---|
| Skim ricotta | 12.9 | 27.0 | dry, crumbly |
| Full fat ricotta | 17.9 | 31.0 | smooth, creamy |
| Non-fat ricotta with texturizing agent | 18.9 | 22 | soft creamy |

Example 2
Non-fat Cheddar Cheese

| Ingredients | Weight/Weight Percentage |
|---|---|
| Pasteurized skim milk | 99.70 |
| Texturizing Agent | 0.30 |
| | 100.00 |
| Annatto Color | (1 ml/gal) |
| Chymogen (diluted 1:10 v/v in water) | (10 ml/gal) |
| Bacterial Culture (DVS 970 pellets) | (0.70 g/gal) |
| Salt | (0.025 lb/lb wet curd) |

Process

1. Powdered texturizing agent was dispersed into 200° F. (93° C.) milk with the aid of a kitchen blender. Once dispersed, the mixture was mixed for five minutes on high speed. The mixture was cooled to 90° F. (32.2° C.), and then the annatto color was added while mixing.

2. The starter culture, DVS 970 pellets, was introduced, with slow overhead stirring. After waiting about 45 minutes for some acid development, the chymogen enzyme was mixed in, with gentle overhead stirring.

3. The product was allowed to sit quiescently at 90° F. (32.2° C.) until smooth curd developed (30–45 minutes).

4. The body of the curd was cut through with a metal spatula. Cross-sectional cuts produced ⅓ to ½ inch curds. The cut curds were left undisturbed until the pH reached 6.1.

5. The mixture was slowly heated, with occasional gentle stirring with a spatula, to 100° F. (37.8° C.) over a 30 minute time period. This temperature was maintained for an additional 30 minutes with only intermittent stirring of curds (once every 5 minutes).

6. The whey was drained from the curds by passing through four layers of cheesecloth. 0.025 lb table salt per one pound of curd was added. The salt was sifted over the curds until uniformly dispersed.

7. The salted curds were transferred into a sterile flat square of cheesecloth. Both ends of the filled cloth were tied to form a tight bag and placed on a clean board. Another board was placed over this, and a pail of water was placed on top (five gallons fill volume).

8. The bag of curd was pressed overnight in a 70° F. (21° C.) room.

9. The next day the molded cheese was removed from the press and the cloth was carefully peeled off. The curd was carefully patted dry with clean cheesecloth or sterile towels.

10. The cheese was totally immersed for five seconds in hot melted food wax. The cheese can be optionally covered tightly with Saran wrap. The cheese was removed and placed on a clean board. The cheese should be stored in refrigeration for two to six months.

The non-fat cheddar cheese containing the texturizing agent was soft and creamy in texture in contrast to the rubbery and dry texture of the skim cheddar without the texturizing agent. The presence of the texturizing agent increased the cheese yield of skim cheddar by 12.4%. Table 2 gives the cheese yield and the sensory data.

TABLE 2

| Product | Cheese Yield (%) | Total Solids (%) | Texture |
|---|---|---|---|
| Skim cheddar | 7.3 | 44.1 | dry, firm, rubbery |
| Full fat cheddar | 10.9 | 46.8 | soft, creamy |
| Skim cheddar with texturizing agent | 9.7 | 36.3 | soft creamy |

Example 3

No-fat Mozzarella Cheese

| Ingredients | Weight/Weight Percentage |
|---|---|
| Pasteurized skim milk | 99.70 |
| Texturizing Agent | 0.30 |
| | 100.00 |
| Chymogen (diluted 1:10 v/v in water) | (10 ml/gal) |
| STC4 Culture | (0.40 g/gal) |
| LHBO1 Culture | (0.40 g/gal) |
| Salt | (0.025 lb/lb wet curd) |

Process

Day 1

1. Powdered texturizing agent was dispersed into 200° F. (93° C.) milk with the aid of a kitchen blender. Once dispersed, mixing was continued on high speed for five minutes. The mixture was cooled to 93° F. (33.9° C.).

2. The starter culture was introduced with slow overhead stirring. The chymogen enzyme was mixed in, with gentle overhead stirring.

3. The product was allowed to sit quiescently at 93° F. (33.9° C.) until a smooth curd developed (30–45 minutes).

4. The body of the curd was cut through with a metal spatula. Cross-sectional cuts produced ⅓ to ½ inch curds. The cut curds were left undisturbed for 15 minutes.

5. The whey was drained from curds by passing through four layers of cheesecloth. Both ends of the cloth were tied off, the bag was rinsed twice with cold clean water.

6. The bag was hung up to drain overnight in the refrigerator.

Day 2

7. The bag was removed and placed in a 90° F. (32.2° C.) oven. It was tested for stretching by dipping a small portion of curd into 170° F. (77° C.) water. The curd was stirred with a spatula for several minutes, then removed and stretched. The dipping and pulling was repeated until the curd could be stretched into a long smooth plastic length with a bright sheen. Once the curd was ready, 1/2 lb portions were formed by dicing and immersing the cubes into a gallon of 170° F. (77° C.) water and stirring gently with a spatula for three to five minutes. Portions of the hot mass were removed from the water and pulled by hand. The hot water immersion was repeated, pulling several times until a smooth curd of bright sheen developed. At that point, it was mold into a finished round ball and then placed into ice water to harden.

8. One pound of table salt was stirred into one gallon of chilled clean water. The cheeses were removed from the unsalted cold water bath and placed into the brine solution so that they were covered completely. They were left in salt brine for three to six hours and then removed, briefly dried, and packaged in Saran wrap.

The no-fat mozzarella containing the texturizing agent was less rubbery in texture with improved "stretch" when melted compared to the no-fat mozzarella prepared without the texturizing agent. A 31% increase in cheese yield was noted in the sample with the texturizing agent versus without the texturizing agent. Table 3 gives the cheese yield and the sensory data.

TABLE 3

| Product | Cheese Yield (%) | Total Solids (%) | Texture |
|---|---|---|---|
| Skim mozzarella | 6.7 | 44.9 | rubbery; translucent appearance; poor stretch when melted |
| Full fat mozzarella | 14.0 | 47.9 | smooth |
| Skim mozzarella with texturizing agent | 8.8 | 42.4 | Less rubbery, improved melt |

Processed Cheese Formulations

Ingredients

Maltodextrin M100 (DE=10) manufactured by Grain Processing Corporation.

Pregelatinized, high amylose starch based texturizing agent (OPTAGRADE®) manufactured by Opta Food Ingredients, Inc., prepared by spray drying hot pregelatinized, high amylose starch and 25% maltodextrin (M040 from Grain Processing Corporation).

Microcrystalline cellulose (Novagel RCN-10) manufactured by the FMC Corporation.

Carrageenans (Gelcarin GP 911 and Seakem GP 418) manufactured by the FMC Corporation.

High flavored, enzyme modified cheddar cheese prepared with a blend of enzymes and comprising cheddar cheese, water, inactivated enzymes, sodium citrate, disodium phosphate and starter distillate (27% fat; 43% moisture). Commercially available under the name Chedr POW'R from Chris Hansen's Laboratory Inc.

Example 4

Preparation of Processed Cheese Under High Shear/High Temperature

Processed cheese was prepared with and without microcrystalline cellulose (FMC Novagel RCN-10) and with and without the starch based texturizing agent.

The ingredients are as follows:

| INGREDIENTS | Hi Shear w/MCC | Hi Shear w/Texturizing Agent |
|---|---|---|
| Skim Cheese | 55.00 | 55.00 |
| Disodium Phosphate | 1.00 | 1.00 |
| Sodium Citrate | 1.50 | 1.50 |
| Salt | 0.50 | 0.50 |
| Nonfat Dry milk | 3.50 | 3.50 |
| Sweet Whey | 6.00 | 6.00 |
| Maltodextrin(DE = 10) | 2.40 | 2.40 |
| 34% whey protein conc. | 1.00 | 1.00 |
| Novagel RCN-10 | 2.00 | |
| Gelcarin GP 911 | 0.30 | 0.30 |
| Seakem GP 418 | 0.10 | 0.10 |
| Texturizing Agent | | 2.00 |
| Water | 15.44 | 15.44 |
| Steam | 9.60 | 9.60 |
| 20% Lactic acid | 1.30 | 1.30 |
| Chedr Pow'r | 1.00 | 1.00 |
| Carot 73-color | 0.06 | 0.06 |
| Total | 100.70 | 100.70 |
| Target Moisture | 57.10 | 57.10 |

The dry ingredients were blended together and then liquid (preferably buttermilk) was added and mixed until smooth. The slurry was added to a small two pound Stephen Mixer/Cooker which was preheated to 90° C. The slurry was heated to 60° C. while mixing at 300 r.p.m. Shredded skim milk cheese was then added and a vacuum was applied to 80%. The slurry was then mixed for 7.5 minutes at 500 r.p.m. and heated to 75° C. At that temperature the vacuum was released, acid was added to the mixture and stirred at 700 r.p.m. for 45 seconds. The mixture was cooled and refrigerated overnight at 5° C.

The products were evaluated for moisture, pH, melt (Schreiber melt test), flavor, texture (mouthfeel and touch), color, slicability (knife and mechanical), shred (ease of shred, dryness, balling on compression, release after compression) and ability to release from plastic packaging after cooling.

The Schreiber melt test was performed by cutting the cheese into 2 inch circles (⅛inch thick) and melting the cheese circles in a preheated oven at 450° F. for 3 minutes. The degree of melt was measured using a template having a number of concentric rings. This test is well known to those skilled in the art.

The results are shown in Table 4. Processed cheese produced under high shear with microcrystalline cellulose was smooth but soft. Processed cheese produced under high shear with texturizing agent contained white particulates.

Example 5

Preparation of Processed Cheese Under Low Shear/High Temperature

Cheese formulations as described in Example 4 were processed in a small five pound pilot plant Hobart Cooker. The cooker applies mild shear and has been found to correlate highly to 35 pound auger pilot plant cooker.

The dry ingredients were blended together and then water was added under agitation to yield a smooth slurry. The slurry was added to the Hobart cooker and slowly agitated. The cooker was heated with steam to 80–85° C. and held for 5 minutes under agitation. Shredded skim milk cheese was added with agitation and steam injection continued until the temperature was 80–85° C. Acid was mixed into the slurry for one minute at high speed. The slurry was removed from the cooker, cooled and stored overnight at 5° C. prior to evaluation.

The ingredients are as follows:

| INGREDIENTS | Hi Shear w/MCC | Hi Shear w/Texturizing Agent |
|---|---|---|
| Skim Cheese | 55.00 | 55.00 |
| Disodium Phosphate | 1.00 | 1.00 |
| Sodium Citrate | 1.50 | 1.50 |
| Salt | 0.50 | 0.50 |
| Nonfat Dry milk | 3.50 | 3.50 |
| Sweet Whey | 6.00 | 6.00 |
| Maltodextrin(DE = 10) | 2.40 | 2.40 |
| 34% whey protein conc. | 1.00 | 1.00 |
| Novagel RCN-10 | 2.00 | |
| Gelcarin GP 911 | 0.30 | 0.30 |
| Seakem GP 418 | 0.10 | 0.10 |
| Texturizing Agent | | 2.00 |
| Water | 15.44 | 15.44 |
| Steam | 9.60 | 9.60 |
| 20% Lactic acid | 1.30 | 1.30 |
| Chedr Pow'r | 1.00 | 1.00 |
| Carot 73-color | 0.06 | 0.06 |
| Total | 100.70 | 100.70 |
| Target Moisture | 57.10 | 57.10 |

The products were evaluated for the parameters described in Example 4. The results are reported in Table 4. Processed cheese produced under low shear with microcrystalline cellulose was better in quality compared to similar cheese produced under high shear. Processed cheese produced under low shear with texturizing agent was better than similar cheese produced under high shear and slightly better than the processed cheese containing microcrystalline cellulose produced under low shear. It had a reduced perfumy flavor.

Example 6

Preparation of Processed Cheese—Partial Replacement of Fillers

The process of Example 5 was followed to prepare processed cheese having the following ingredients:

|  | Sample | | | | |
|---|---|---|---|---|---|
| INGREDIENTS | A | B | C | D | E |
| Skim Cheese | 64.84 | 64.84 | 64.84 | 64.84 | 64.84 |
| Disodium Phosphate | 2.00 | 2.00 | 2.00 | 2.00 | 2.00 |
| Trisodium Phosphate | 0.60 | 0.60 | 0.60 | 0.60 | 0.60 |
| Sweet Whey | 4.00 | 4.00 | 4.00 | 4.00 | 4.00 |
| Maltodextrin(DE = 10) | 2.00 | 2.00 | | | |
| Nonfat Dry milk | 4.00 | | 6.00 | 3.00 | |
| Texturizing Agent | | 2.00 | | 2.00 | 2.00 |
| Chedr Pow'r | 1.00 | 1.00 | 1.00 | 1.00 | 1.00 |
| Water | 9.50 | 11.50 | 9.50 | 10.50 | 13.50 |
| Steam | 8.00 | 8.00 | 8.00 | 8.00 | 8.00 |
| 20% Lactic acid | 4.00 | 4.00 | 4.00 | 4.00 | 4.00 |
| Carot 73-color | 0.60 | 0.60 | 0.60 | 0.60 | 0.60 |
| Total | 100.00 | 100.00 | 100.00 | 100.00 | 100.00 |
| Target Moisture | 55.87 | 57.77 | 55.87 | 56.81 | 59.67 |

The results as evaluated according to Example 4 are shown in Table 5. The Sample B processed cheese was slightly soft whereas the Sample D formulation yielded a processed cheese well suited for block/shred formats.

Example 7

Preparation of Processed Cheese—Partial Replacement of Skim Milk Cheese

The process of Example 5 was followed to prepare processed cheese having the following ingredients:

|  | Sample | | | |
|---|---|---|---|---|
| INGREDIENTS | A | B | C | D |
| Skim Cheese | 50.00 | 55.00 | 60.00 | 64.84 |
| Disodium Phosphate | 1.50 | 1.50 | 1.75 | 2.00 |
| Trisodium Phosphate | 0.50 | 0.50 | 0.50 | 0.60 |
| Sweet Whey | 8.00 | 6.25 | 4.00 | 4.00 |
| Maltodextrin(DE = 10) | 3.00 | 3.00 | 3.00 | |
| Nonfat Dry milk | 2.94 | 2.19 | 2.19 | 3.00 |
| Texturizing Agent | 2.00 | 2.00 | 2.00 | 2.00 |
| Chedr Pow'r | 1.00 | 1.00 | 1.00 | 1.00 |
| Water | 19.50 | 16.50 | 13.50 | 9.50 |
| Steam | 8.00 | 8.00 | 8.00 | 8.00 |
| 20% Lactic acid | 4.00 | 4.00 | 4.00 | 4.00 |
| Carot 73-color | 0.06 | 0.06 | 0.06 | 0.06 |
| Total | 100 | 100 | 100 | 100 |
| Target Moisture | 57.92 | 57.89 | 57.39 | 56.81 |

Skim milk levels from 50–65 of the finished product were evaluated and the results shown in Table 6. Sample A cheese contained a high percentage of white particulates, indicating that hydration of starch was inadequate. Formulation for Sample B resulted in a poor processed cheese. The formulation for Sample C resulted in a soft, wet processed cheese.

Example 8

Preparation of Processed Cheese with Varying Amounts of Texturizing Agent and Carrageenan

The process of Example 5 was followed to prepare processed cheese having the following ingredients:

|  | Sample | | | | | |
|---|---|---|---|---|---|---|
| INGREDIENTS | A | B | C | D | E | F |
| Skim Cheese | 55.00 | 55.00 | 55.00 | 55.00 | 55.00 | 55.00 |
| Disodium Phosphate | 1.00 | 1.00 | 1.00 | 1.00 | 1.00 | |
| Sodium Citrate | 1.50 | 1.50 | 1.50 | 1.50 | 1.50 | |
| Sweet Whey | 6.50 | 6.50 | 6.50 | 6.50 | 6.50 | |
| Maltodextrin(DE = 10) | 1.49 | 1.89 | 1.99 | 2.39 | 0.99 | |
| Nonfat Dry milk | 3.00 | 3.00 | 3.00 | 3.00 | 3.00 | |
| Texturizing Agent | 2.00 | 2.00 | 1.50 | 1.50 | 2.50 | |
| Gelcarin GP 911 | 0.30 | | 0.30 | | 0.30 | |
| Seakem GP 418 | 0.10 | | 0.10 | | 0.10 | |
| Salt | 0.50 | 0.50 | 0.50 | 0.50 | 0.50 | |
| Chedr Powr | 1.00 | 1.00 | 1.00 | 1.00 | 1.00 | |
| Water | 18.25 | 18.25 | 18.25 | 18.25 | 18.25 | |
| Steam | 8.00 | 8.00 | 8.00 | 8.00 | 8.00 | |
| 20% Lactic acid | 1.30 | 1.30 | 1.30 | 1.30 | 1.30 | |
| Carot 73-color | 0.06 | 0.06 | 0.06 | 0.06 | 0.06 | |
| Total | | | | | | |
| Target Moisture | 56.99 | 56.99 | 56.99 | 56.99 | 56.99 | |

The results are reported in Table 7. Formulations for Samples A, B and C yield processed cheeses of excellent quality. Sample D was soft and similar to VELVEETA™ brand processed cheese and was not pasty. Sample E lacked flavor but had the best mechanical slice characteristics compared to the other samples.

TABLE 4

| PRODUCT | MOISTURE | pH | MELT 0-10 | SHRED* | SLICABILITY** KNIFE MECHANIC WIRE | | | COLOR | FLAVOR | TEXTURE |
|---|---|---|---|---|---|---|---|---|---|---|
| Hi Shear w/MCC | 57.40 | 5.90 | 4.00 | Not good Hi fines Hi wet/soft Balling+ Release− | Smooth OK, but soft OK | Feathers | Not mottled | Clean Perfumy | | Only sl. dry Sl. firm Pasty Low chew |
| Hi Shear w/Texturizing Agent | 58.51 | 5.92 | 5.00 | Sl. tacky OK fines No ball | OK Good for chill rolls Good Release after ball good | OK | Sl. "feather" | Mottled White particulates | Clean No Acid | Dry, mealy Soft, but OK for slices |

TABLE 4-continued

| PRODUCT | MOISTURE | pH | MELT 0–10 | SHRED* | SLICABILITY** KNIFE | MECHANIC | WIRE | COLOR | FLAVOR | TEXTURE |
|---|---|---|---|---|---|---|---|---|---|---|
| Low Shear w/MCC | 59.42 | 5.90 | 4.50 | Nice Lo fines | OK | OK | Sl. "feather" | Reduced mottle | Cheesy | V. firm Resists cut |
| | | | | | Long, dry Ball+ Release++ | | | | | |
| Low Shear w/Texturizing Agent | 59.95 | 5.82 | 4.25 | Very firm Lo fines Ball++ | OK | OK | OK | Little mottle Translucent No white particulates | Clean Cheesy | Firm Little mot. Moist Lo "feather" |
| | | | | | Release++ Dry | | | | | |

*SHRED = LOOKING FOR DRY, LONG SHREDS; FEW FINES, NO OR LITTLE BALLING ON COMPRESSION, IF BALLING EASY RELEASE
**SLICABILITY = LOOKING FOR FIRM, DRY SLICE VIA KNIFE, MECHANICAL, WIRE; ABILITY TO TRANSLATE TO "CHILL ROLL" SLICE PROCESS

TABLE 5

| PRODUCT | MOISTURE | pH | MELT 0–10 | SHRED* | SLICABILITY** KNIFE | MECHANIC | WIRE | COLOR | FLAVOR | TEXTURE |
|---|---|---|---|---|---|---|---|---|---|---|
| A | 59.50 | 5.66 | 10+ | Long Some fines Lo mat Hi release | Firm Clean cut | OK | Feathers | Burnt Uniform | Clean Sl. tart Sweet Perfumy | Smooth Feels dry |
| B | 61.26 | 5.56 | 5.75 | Equal to A Lo fines Lo mat Good release | Sl. firmer than A | OK | feather | Hi White Partic. | OK Strong cheesy Tart | Clean dry, mealy Pasty mouthfeel |
| C | 58.93 | 5.70 | 10+ | Long few fines Best of Grp. Lo mat Hi release | Much better than A, B | Clean & OK | Lo feather | Good Uniform Nice | Sl. cheese Lo acid Clean | Dry, firm Not mealy smooth |
| D | 59.92 | 5.56 | 5.75 | Nice shred Long Lo fines Lo mat Hi release | V. Firm Smooth Lo fines Long | V. Good | Sl. feather | Few white particul. Good | Good Clean Sl. acid | Firm Elastic Tough chew Good for block/shred |
| E | 61.38 | 5.57 | 4.50 | Soft Short Not as good as C Hi mat Lo release | OK | Too soft? | Clean No feath. | Very hi white particul. | Acid/tart Not fine cheese Dry aftertaste | Good Soft Wet, but not tacky Pasty, mealy |

*SHRED = LOOKING FOR DRY, LONG SHREDS; FEW FINES, NO OR LITTLE BALLING ON COMPRESSION, IF BALLING EASY RELEASE
**SLICABILITY = LOOKING FOR FIRM, DRY SLICE VIA KNIFE, MECHANICAL, WIRE; ABILITY TO TRANSLATE TO "CHILL ROLL" SLICE PROCESS

TABLE 6

| PRODUCT | MOISTURE | pH | MELT 0–10 | SHRED* | KNIFE | SLICABILITY** MECHANIC | WIRE | COLOR | FLAVOR | TEXTURE |
|---|---|---|---|---|---|---|---|---|---|---|
| A | 61.91 | 5.52 | 10+ | Mealy Crumbles Hi fines Hi mat | Soft | No | Hi feather | OK | Cheesy Sl acid/ acid | Mealy Soft Wet |
| B | 61.62 | 5.64 | 10+ | Soft, but better than | Soft | No | Wet | Looks wet | Mealy Lacks flavor Acid tart | Very wet |
| C | 61.32 | 5.50 | 10+ | Crumbly Short Soft Mats w/o | Feels rough | No | Wet Feathery Poor | Hi white particulate | Dirty No cheese Sl. acid | Soft Wet Tacky Pasty |

TABLE 6-continued

| PRODUCT | MOISTURE | pH | MELT 0–10 | SHRED* | KNIFE | SLICABILITY** MECHANIC | WIRE | COLOR | FLAVOR | TEXTURE |
|---|---|---|---|---|---|---|---|---|---|---|
| D | 59.92 | 5.56 | 5.75 | release Nice Few fines Long dry | V. Firm Good | V. Good | OK Sl. feather | Good Uniform | Sl. cheese Sl. tart Clean | Dry Not mealy firm Smooth |

*SHREDS = LOOKING FOR DRY, LONG SHREDS; FEW FINES, NO OR LITTLE BALLING ON COMPRESSION, IF BALLING EASY RELEASE
**SLICABILITY = LOOKING FOR FIRM, DRY SLICE VIA KNIFE, MECHANICAL, WIRE; ABILITY TO TRANSLATE TO "CHILL ROLL" SLICE PROCESS

TABLE 7

| PRODUCT | MOISTURE | pH | MELT 0–10 | SHRED* | KNIFE | SLICABILITY** MECHANIC | WIRE | COLOR | FLAVOR | TEXTURE |
|---|---|---|---|---|---|---|---|---|---|---|
| A | 61.38 61.48 | 5.78 5.82 | 10+ 10+ | Nice Few fines Long Lo mat | Good | Good | Sl. feather | Very good Lacks | Clean Not tacky cheese | Firm Clean Sl. Pasty |
| B | 61.48 | 5.82 | 10+ | Sl. dry Similar to A/B Long Few fines | Good | ?? | Good | Very good Perfumy | Sl. salty Not mealy | Soft Same as A/B |
| C | 60.96 | 5.79 | 10+ | Easy shred few fines Long Mats w/release | Very good | Only sl. Very good | Good feather | Clean mouthfeel | Very firm Sl. cheese | Very clean Not tacky |
| D | 60.93 | 5.78 | 10+ | Wet Sl. long Mats, but good release | Clean | NO | Nice w/o feather | Good | Mild flavor OK | Wet Tacky Moist |
| E | 59.90 | 5.78 | 10+ | Excellent Long Clean Mats w/ release | Great Even cut | OK | OK | Good | Flat | Firm Not tacky |
| F*** | 61.52 | 5.80 | 10+ | Great Long Mats w/ release | OK | OK | Sl feather Waters off | Good | Sl. cheese Sl. salt Grainy | Soft Sl. wet |

*SHREDS = LOOKING FOR DRY, LONG SHREDS; FEW FINES, NO OR LITTLE BALLING ON COMPRESSION, IF BALLING EASY RELEASE
**SLICABILITY = LOOKING FOR FIRM, DRY SLICE VIA KNIFE, MECHANICAL, WIRE; ABILITY TO TRANSLATE TO "CHILL ROLL" SLICE PROCESS
***MISSED 5 MINUTE HOLD AT 80° C.

Equivalents

Those skilled in the art will recognize, or be able to ascertain using no more than routine experimentation, many equivalents to the specific embodiments of the invention described herein. Such equivalents are intended to be encompassed by the following claims:

What is claimed is:

1. A fat free natural or processed cheese comprising a non-fat dairy ingredient, one or more flavoring agents, and a starch based texturizing agent derived from pregelatinized, high amylose starch in which the starch has a dextrose equivalent value of less than five.

2. The fat free cheese of claim 1 which is a natural cheese.

3. The fat free cheese of claim 1 which is a processed cheese.

4. The fat free cheese of claim 2, wherein the starch based texturizing agent is present in amount of from about 0.1% to about 1.0% by weight.

5. The fat free cheese of claim 4, wherein the starch based texturizing agent is present in amount of from about 0.2% to about 0.4% by weight.

6. The fat free cheese of claim 3, wherein the starch based texturizing agent is present in amount of from about 1.0% to about 4.0% by weight.

7. The fat free cheese of claim 6, wherein the starch based texturizing agent is present in amount of from about 1.5% to about 2.5% by weight.

8. The fat free cheese of claim 3, further comprising an emulsifying salt.

9. The fat free cheese of claim 8, wherein the emulsifying salt is selected from the group consisting of disodium phosphate, trisodium phosphate, sodium citrate and combinations thereof.

10. The fat free cheese of claim 1, wherein the non-fat dairy ingredient is selected from the group consisting of skim milk cheese, non-fat drymilk, skim milk, skim butter milk, milk protein isolates and combinations of these.

11. The fat free cheese of claim 1, wherein the starch based texturizing agent comprises an excipient.

12. The fat free cheese of claim 11, wherein the excipient is maltodextrin.

13. The fat free cheese of claim 1, wherein the starch based texturizing agent comprises maltodextrin and high amylose starch that has been pregelatinized, wherein said texturizing agent is spray dried into a powder which is retrograded and crystalline, partially retrograded and crystalline, or nonretrograded and noncrystalline.

14. The fat free cheese of claim 1, further comprising at least one gelling polysaccharide.

15. The fat free cheese of claim 14, wherein the gelling polysaccharide is selected from the group consisting of carrageenan, alginate, guar gum, locust bean gum, konjac gum and combinations thereof.

16. The fat free cheese of claim 1, further comprising a carbohydrate product.

17. The fat free cheese of claim 16, wherein the carbohydrate product is selected from the group consisting of microcrystalline cellulose and carboxymethyl cellulose.

18. A reduced fat or low fat natural or processed cheese comprising a low fat dairy ingredient, one or more flavoring agents, and a starch based texturizing agent derived from pregelatinized, high amylose starch in which the starch has a dextrose equivalent value of less than five.

19. The reduced fat or low fat cheese of claim 18 which is a natural cheese.

20. The reduced fat or low fat cheese of claim 18 which is a processed cheese.

21. The reduced fat or low fat cheese of claim 19, wherein the starch based texturizing agent is present in amount of from about 0.1% to about 1.0% by weight.

22. The reduced fat or low fat cheese of claim 21, wherein the starch based texturizing agent is present in amount of from about 0.2% to about 0.4% by weight.

23. The reduced fat or low fat cheese of claim 20, wherein the starch based texturizing agent is present in amount of from about 1.0% to about 4.0% by weight.

24. The reduced fat or low fat cheese of claim 23, wherein the starch based texturizing agent is present in amount of from about 1.5% to about 2.5% by weight.

25. The reduced fat or low fat cheese of claim 20, further comprising an emulsifying salt.

26. The reduced fat or low fat cheese of claim 25, wherein the emulsifying salt is selected from the group consisting of disodium phosphate, trisodium phosphate, sodium citrate and combinations thereof.

27. The reduced fat or low fat cheese of claim 18, wherein the dairy ingredient is selected from the group consisting of skim milk cheese, non-fat drymilk, skim milk, milk protein isolates, skim butter milk and combinations thereof.

28. The reduced fat or low fat cheese of claim 18, further comprising a fat-containing dairy ingredient selected from the group consisting of whole milk, whole milk cheese, reduced fat milk, reduced fat milk cheese and combinations thereof.

29. The reduced fat or low fat cheese of claim 18, wherein the starch based texturizing agent comprises an excipient.

30. The reduced fat or low fat cheese of claim 29, wherein the excipient is maltodextrin.

31. The reduced fat or low fat cheese of claim 18, wherein the starch based texturizing agent comprises maltodextrin and high amylose starch that has been pregelatinized, wherein said texturizing agent is spray dried into a powder which is retrograded and crystalline, partially retrograded and crystalline, or nonretrograded and noncrystalline.

32. The reduced fat or low fat cheese of claim 18, further comprising at least one gelling polysaccharide.

33. The reduced fat or low fat cheese of claim 32, wherein the gelling polysaccharide is selected from the group consisting of carrageenan, alginate, guar gum, locust bean gum, konjac gum and combinations thereof.

34. The reduced fat or low fat cheese of claim 18, further comprising a carbohydrate product.

35. The reduced fat or low fat cheese of claim 34, wherein the carbohydrate product is selected from the group consisting of microcrystalline cellulose and carboxymethyl cellulose.

36. A method of making a fat free or reduced fat natural or processed cheese, said method comprising replacing at least a portion of fat traditionally incorporated into a cheese with a starch based texturizing agent derived from pregelatinized, high amylose starch in which the starch has a dextrose equivalent value of less than five.

* * * * *